United States Patent [19]
Hatch

[11] 3,986,405
[45] Oct. 19, 1976

[54] MOTION TRANSLATION MECHANISM
[75] Inventor: Meredith R. Hatch, Toledo, Ohio
[73] Assignee: Henzler Manufacturing Corporation, Toledo, Ohio
[22] Filed: Apr. 11, 1975
[21] Appl. No.: 567,419

[52] U.S. Cl. ................................. 74/29; 74/89.12
[51] Int. Cl.² .................................. F16H 19/04
[58] Field of Search ........................ 74/29–34, 74/89.12, 422

[56] References Cited
UNITED STATES PATENTS
751,660   2/1904   Larrabee ........................ 74/29
2,502,057   3/1950   Mitchell ........................ 74/29

FOREIGN PATENTS OR APPLICATIONS
326,937   9/1934   Italy ........................ 74/29
480,510   2/1951   Italy ........................ 74/29

*Primary Examiner*—Samuel Scott
*Assistant Examiner*—Wesley S. Ratliff, Jr.
*Attorney, Agent, or Firm*—W. A. Schaich

[57] ABSTRACT

This invention relates to an improved motion translation mechanism for use in transferring workpieces from one station to the next in a multi-station forming press. Essentially, the improved mechanism converts a continuous rotary motion into a reciprocating motion with a dwell period at each of the two extreme limits of the reciprocatory motion.

4 Claims, 2 Drawing Figures

MOTION TRANSLATION MECHANISM

BACKGROUND OF THE INVENTION

There are numerous disclosures in the prior art of mechanisms for effecting the transfer of workpieces from one station in a multi-station forming die to the next successive station. For example, see U.S. Pat. No. 3,832,881 to Henzler and Spino. The essential motion required to effect the transfer of workpieces is rectilinear, namely, the workpiece must be lifted vertically from the station where an operation has just been performed on it, a sufficient distance to clear the forming die, then moved horizontally to a position overlying the next station in the forming die, then moved vertically downwardly into such next station, where it remains during the next stroke of the forming press. Obviously, the mechanism which translates the workpieces through such movements, has to be returned horizontally to its original position.

It follows, therefore, that every workpiece transfer mechanism requires some means for providing a horizontal reciprocating motion of the workpiece support frame with an equal dwell period at each extreme end of the horizontal motion. Prior arrangements for providing such motion have employed hydraulic cylinders and limit switches and have suffered the disadvantage of not being as accurate and trouble-free as desired. Furthermore, an elaborate and expensive hydro-electrical control system is necessitated to effect the desired horizontal reciprocating motion and the desired dwell periods at each of the extreme ends of the horizontal reciprocating motions.

OBJECTS OF THE INVENTION

Accordingly, it is an object of this invention to provide an improved motion translation mechanism for a workpiece transfer system to be utilized in conjunction with a multi-station forming press.

A particular object of this invention is to provide a motion translation mechanism which will effect the movement of a workpiece carrying frame in a horizontal reciprocating mode, with a substantial dwell period at each end of the horizontal motion, and all of said motions being derived mechanically from a simple rotation power source, such as an electric motor.

Other objects and advantages of the invention will become apparent to those skilled in the art from the following detailed description, taken in conjunction with the annexed sheets of drawings, on which:

DESCRIPTION OF THE INVENTION

Figure 1:
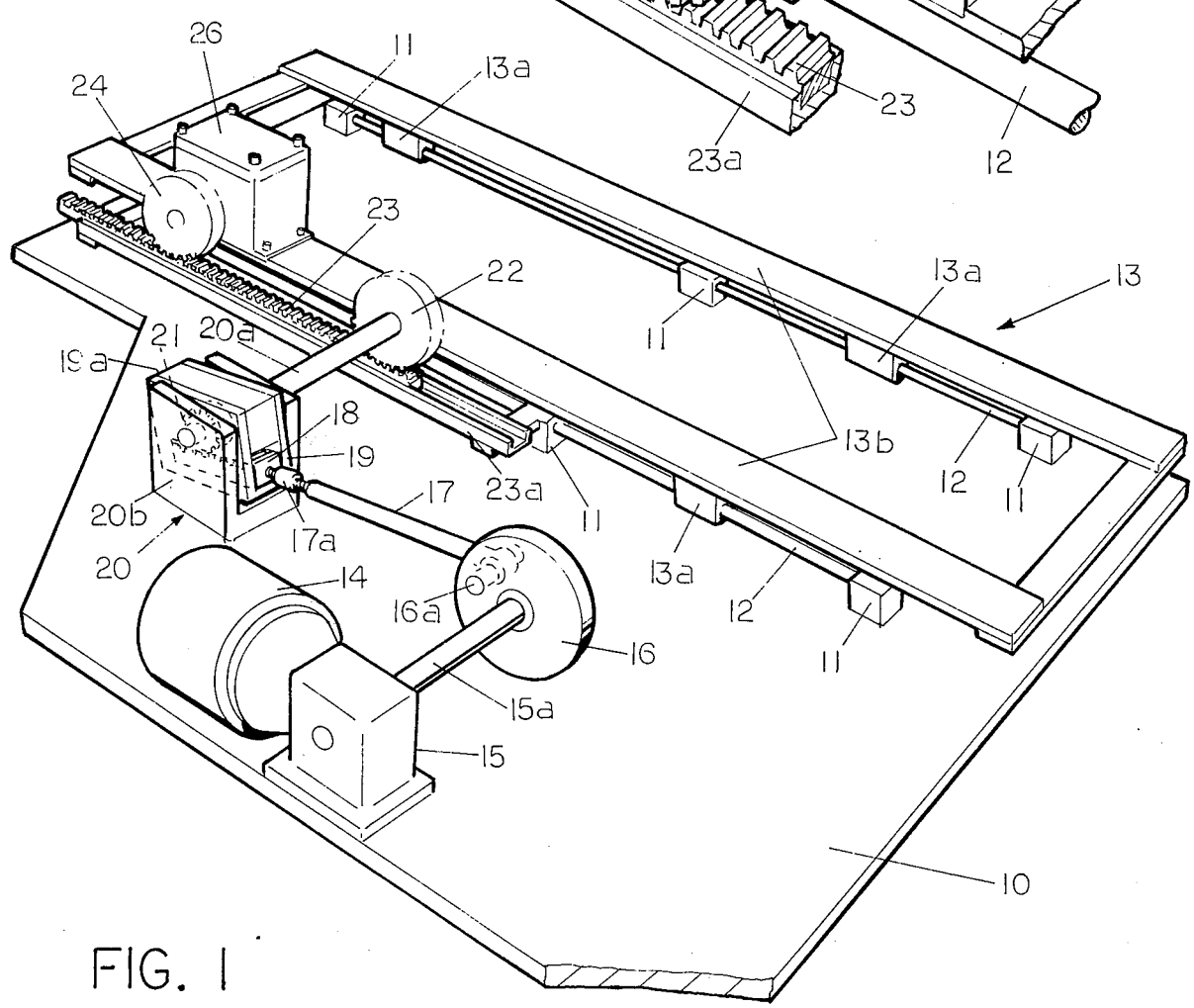
FIG. 1 is a schematic perspective view of the basic elements of a workpiece translating mechanism incorporating the motion converting device of this invention.

Referring to FIG. 1, the numeral 10 indicates a base plate which may be suitably mounted on the platen (not shown) of a reciprocating press. A plurality of opposed pairs of upstanding guide lugs 11 are provided on base plate 10 and are suitably apertured to mount a pair of parallel slide rods 12. A generally rectangular frame structure 13 is provided, having a plurality of depending lugs 13a suitably apertured to permit their slidable mounting on the guide rods 12 and in this fashion, the frame 13 is mounted for limited horizontal reciprocating motion relative to the base plate 10.

While not shown in the drawings, because it forms no part of this invention, those skilled in the art will recognize that the frame 13 may be utilized as the base portion of a workpiece translating mechanism which effects the successive transfer of workpieces from one station to another in a multi-station forming die that is mounted on the platen of the press (not shown). For example, the forming die may be disposed between the two spaced apart longitudinal elements 13b forming the rectilinear frame 13. The frame 13 is required to be moved very accurately in a reciprocatory fashion relative to the forming die (not shown) to effect the horizontal transfer of successive workpieces between the successive stations of the forming die and, equally important, the frame 13 must remain at each extreme end of its reciprocatory motion for a dwell period during which either the workpieces are dropped into the die stations and forming operation is performed on the workpieces, or the workpieces are lifted out of the die stations.

The reciprocatory motion of frame 13 is derived from an electric motor 14 which in turn drives a right angle reduction gear box 15 having an output shaft 15a. A crank disc 16 is mounted on the free end of shaft 15a and a link 17 is pivotally secured to the crank disc 16 by a pin 16a.

The opposite end of link 17 has a threadably adjustable connection 17a to a rack 18 which reciprocates in a U-shaped guide block 19. Sidewalls 13a of guide block 19 are pivotally mounted on a horizontal shaft 20a which is journalled in the sidewalls 20b of a U-shaped bearing block 20. A pinion 21 is keyed to shaft 20a intermediate the sidewalls of the U-shaped guide 19 and pinion 21 is driven by rack 18, thereby converting the continuous rotary motion of the crank disc 16 into a continuously repeated rotary motion of shaft 20a, first in one direction and then in the reverse direction.

The other end of shaft 20a mounts a gear 22 which cooperates with a horizontal rack 23 which is slidably mounted in a track member 23a fixedly secured to the base 10, parallel with and adjacent to one side of the slidably mounted frame 13. A driving connection between frame 13 and rack 23 is effected by a gear 24 which is keyed to a shaft 25 projecting out of the side of a boxlike structure 26 which is rigidly secured to the adjacent side frame member 13b of the reciprocatory frame 13.

Figure 2:
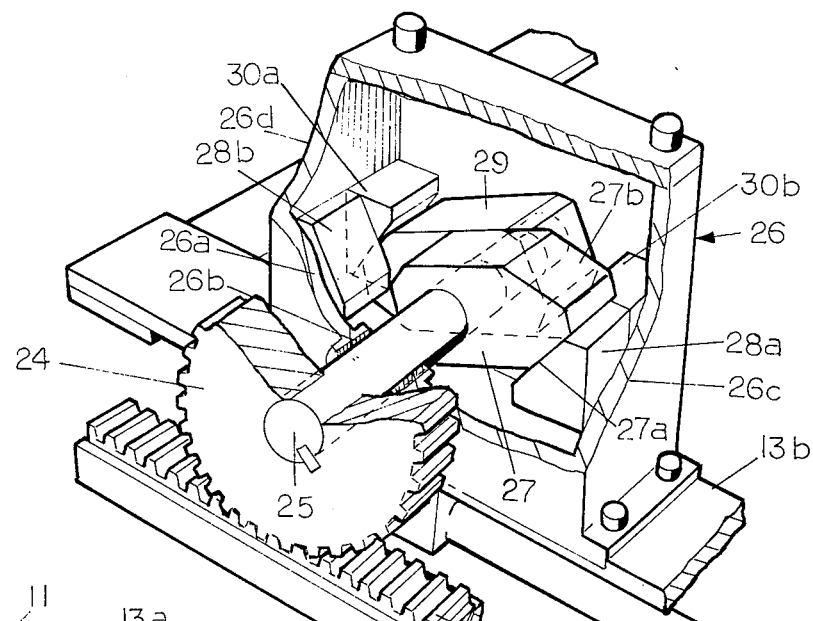
FIG. 2 is an enlarged scale, perspective view, with portions broken away for clarity of illustration, of a portion of the mechanism of FIG. 1.

Referring more particularly to FIG. 2, it will be noted that the shaft 25 is journalled in suitable bearings 26b provided in the sidewalls 26a of the mechanism box 26. On that portion of shaft 25 that lies within the box 26, a stop block 27 is keyed to the shaft 25. Stop block 27 has a surface 27a which engages with a first rigid abutment 28a secured to an endwall 26c of the mechanism box 26. On the opposite endwall 26d a second rigid abutment 28b is mounted which is engaged by a surface 27b when shaft 25 is rotated in the opposite direction.

Obviously, shaft 25 can be oscillated only through a limited angle in either direction, until either the stop block 27 will contact the abutment 28a or in the opposite direction the stop block 27 will contact the abutment 28b. While shaft 25 is freely turning, it is obvious that no reciprocatory motion is imparted to the frame 13 and hence the periods of free motion of the shaft corresponds to the dwell period of the reciprocatory frame 13. To prevent any bouncing of frame 13 from the impact of stop block 27 against box 26, a second stop block 29 may be keyed to shaft 25 and cooperates with two abutments 30a and 30b respectively simultaneously with the engagements of stop block 27 with abutments 28a and 28b. However, the impact force generated by stop block 29 on box 26 and frame 13 is always equal and opposite to that generated by stop block 27.

When both stop blocks 27 and 29 are in contact with their corresponding aboutments 28a and 30a, it is apparent that the shaft 25 and hence gear 24, will be locked against any further rotational movement, hence further movement of the rack 23 in the same direction can only result in horizontal motion of the reciprocatory frame 13 in the same direction and to the same extent as the rack 23 is shifted by the gear 22.

It is therefore apparent that the described mechanism converts a continuous rotating motion supplied by the motor 14 into a linear reciprocatory motion of the frame 13, with a predetermined dwell period occurring at each end of such reciprocatory motion. In other words, once the rack 23 is shifted to one of its extreme horizontal positions by the oscillating gear 22, the reversal of gear 22 and the initiation of return movement of rack 23 does not effect any movement of frame 13 until shaft 25 has moved angularly a sufficient distance to bring the stop blocks 27 and 29 into engagement with the abutments 28a and 30a respectively. Therefore, the reciprocatory motion of the frame 13 will be accurately repeated, time after time, and hence there is no opportunity for a workpiece to be moved either too far or too short, with respect to its next position in the multiple stage die.

While this invention has been particularly described as being applicable to multi-station forming presses, it is obvious that the principles thereof are applicable to any machine wherein a highly accurate reciprocatory motion is required with an accurate dwell period being additionally necessary at each extreme end of the reciprocatory motion.

I claim:

1. Motion translation mechanism comprising a reciprocable gear rack, power means for continuously reciprocating said rack, a driven element mounted adjacent said rack for reciprocable linear movements, a housing rigidly secured to said driven element, a shaft journalled in said housing in overlying relationship to said rack and (disposed in a plane) perpendicular to the path of said rack, a gear secured to said shaft and engaging said rack, and stop means for limiting the angular movement of said shaft relative to said housing in both directions of rotation, whereby said driven element is secured to (moves with) said rack for co-movement therewith only during a portion of each stroke of said rack and said driven element is at rest during the balance of each said stroke of said rack.

2. The mechanism defined in claim 1 wherein said last-mentioned means comprises a pair of stops, one stop being secured to said shaft and the other stop being secured to said housing and projecting into the path of rotation of said one stop.

3. The mechanism defined in claim 1, wherein said last-mentioned means has simultaneous, equal and opposite impacts on said housing.

4. The combination defined in claim 3, wherein said last-mentioned means comprises a first abutment on a first wall of said housing, a second abutment on an opposed second wall of said housing, and a pair of angularly spaced stops secured to said shaft and arranged to simultaneously impact said abutments respectively in opposite directions, thereby eliminating bouncing of said driven element.

* * * * *